US009672286B2

United States Patent
Soroushian et al.

(10) Patent No.: US 9,672,286 B2
(45) Date of Patent: Jun. 6, 2017

(54) SINGULAR, COLLECTIVE AND AUTOMATED CREATION OF A MEDIA GUIDE FOR ONLINE CONTENT

(71) Applicant: Sonic IP, Inc., San Diego, CA (US)

(72) Inventors: Kourosh Soroushian, San Diego, CA (US); Daniel Salmonsen, San Diego, CA (US); Porfirio Landeros, San Diego, CA (US); Shaiwal Priyadarshi, San Deigo, CA (US); Francois Gravel, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 14/924,639

(22) Filed: Oct. 27, 2015

(65) Prior Publication Data

US 2016/0048593 A1   Feb. 18, 2016

Related U.S. Application Data

(63) Continuation of application No. 13/938,100, filed on Jul. 9, 2013, now Pat. No. 9,201,922, which is a
(Continued)

(51) Int. Cl.
*G06F 17/30* (2006.01)
*G06F 15/16* (2006.01)
(Continued)

(52) U.S. Cl.
CPC ........ *G06F 17/30864* (2013.01); *G06F 15/16* (2013.01); *G06F 17/30386* (2013.01);
(Continued)

(58) Field of Classification Search
CPC ......... G06F 17/30864; G06F 17/30386; G06F 17/30598; G06F 17/30876; G06F 15/16; H04N 21/23109; H04N 21/278
See application file for complete search history.

(56) References Cited

U.S. PATENT DOCUMENTS 5,361,332 A   11/1994   Yoshida et al.
5,404,436 A   4/1995   Hamilton
(Continued)

FOREIGN PATENT DOCUMENTS

CN   1169229   12/1997
EP   813167 A2   12/1997
(Continued)

OTHER PUBLICATIONS

"TinySong is like TinyURL for music", Wayback Machine, wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.
(Continued)

*Primary Examiner* — Huawen A Peng
(74) *Attorney, Agent, or Firm* — KPPB LLP

(57) ABSTRACT

Systems and methods are provided in which a content guide includes one or more tags associated with a single user, a group of users or a channel subscribed to by users that enables the retrieval of content for subsequent viewing and which can be supplemented by recommendations and data from other sources.

31 Claims, 4 Drawing Sheets

Related U.S. Application Data continuation of application No. 12/684,002, filed on Jan. 7, 2010, now Pat. No. 8,510,303.

(60) Provisional application No. 61/143,114, filed on Jan. 7, 2009.

(51) Int. Cl.
*H04N 21/231* (2011.01)
*H04N 21/278* (2011.01)

(52) U.S. Cl.
CPC .. *G06F 17/30598* (2013.01); *G06F 17/30876* (2013.01); *H04N 21/23109* (2013.01); *H04N 21/278* (2013.01)

(56) References Cited

U.S. PATENT DOCUMENTS

| | | | |
|---|---|---|---|
| 5,479,303 A | 12/1995 | Suzuki et al. | |
| 5,717,816 A | 2/1998 | Boyce et al. | |
| 5,867,625 A | 2/1999 | McLaren | |
| 5,887,110 A | 3/1999 | Sakamoto et al. | |
| 5,946,446 A | 8/1999 | Yanagihara | |
| 6,018,611 A | 1/2000 | Nogami et al. | |
| 6,031,622 A | 2/2000 | Ristow et al. | |
| 6,047,100 A | 4/2000 | McLaren | |
| 6,058,240 A | 5/2000 | McLaren | |
| 6,097,877 A | 8/2000 | Katayama et al. | |
| 6,155,840 A | 12/2000 | Sallette | |
| 6,195,388 B1 | 2/2001 | Choi et al. | |
| 6,222,981 B1 | 4/2001 | Rijckaert | |
| 6,292,621 B1 | 9/2001 | Tanaka et al. | |
| 6,389,218 B2 | 5/2002 | Gordon et al. | |
| 6,418,270 B1 | 7/2002 | Steenhof et al. | |
| 6,466,733 B1 | 10/2002 | Kim | |
| 6,510,554 B1 | 1/2003 | Gordon et al. | |
| 6,621,979 B1 | 9/2003 | Eerenberg et al. | |
| 6,658,056 B1 | 12/2003 | Duruöz et al. | |
| 6,714,909 B1 | 3/2004 | Gibbon et al. | |
| 6,807,306 B1 | 10/2004 | Girgensohn et al. | |
| 6,859,496 B1 | 2/2005 | Boroczky et al. | |
| 6,956,901 B2 | 10/2005 | Boroczky et al. | |
| 6,965,724 B1 | 11/2005 | Boccon-Gibod et al. | |
| 7,023,924 B1 | 4/2006 | Keller et al. | |
| 7,231,132 B1 | 6/2007 | Davenport | |
| 7,242,772 B1 | 7/2007 | Tehranchi | |
| 7,478,325 B2 | 1/2009 | Foehr et al. | |
| 7,676,555 B2 * | 3/2010 | Bushee | G06F 17/30864 709/203 |
| 7,720,352 B2 | 5/2010 | Belknap et al. | |
| 7,962,942 B1 | 6/2011 | Craner | |
| 7,991,156 B1 | 8/2011 | Miller | |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,065,708 B1 | 11/2011 | Smyth et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,265,168 B1 | 9/2012 | Masterson et al. | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,291,460 B1 | 10/2012 | Peacock | |
| 8,311,115 B2 | 11/2012 | Gu et al. | |
| 8,321,556 B1 | 11/2012 | Chatterjee et al. | |
| 8,346,753 B2 * | 1/2013 | Hayes | G06F 17/30864 707/709 |
| 8,386,621 B2 | 2/2013 | Park | |
| 8,412,841 B1 | 4/2013 | Swaminathan et al. | |
| 8,456,380 B2 | 6/2013 | Pagan | |
| 8,464,066 B1 | 6/2013 | Price et al. | |
| 8,472,792 B2 | 6/2013 | Butt | |
| 8,510,303 B2 | 8/2013 | Soroushian et al. | |
| 8,515,265 B2 | 8/2013 | Kwon et al. | |
| 8,914,836 B2 | 12/2014 | Shivadas et al. | |
| 9,201,922 B2 | 12/2015 | Soroushian et al. | |
| 2002/0136298 A1 | 9/2002 | Anantharamu et al. | |
| 2003/0002578 A1 | 1/2003 | Tsukagoshi et al. | |
| 2003/0152370 A1 | 8/2003 | Otomo et al. | |
| 2003/0163824 A1 | 8/2003 | Gordon et al. | |
| 2003/0231863 A1 | 12/2003 | Eerenberg et al. | |
| 2003/0231867 A1 | 12/2003 | Gates et al. | |
| 2003/0233464 A1 | 12/2003 | Walpole et al. | |
| 2003/0236836 A1 | 12/2003 | Borthwick | |
| 2003/0236907 A1 | 12/2003 | Stewart et al. | |
| 2004/0093618 A1 | 5/2004 | Baldwin et al. | |
| 2004/0136698 A1 | 7/2004 | Mock | |
| 2004/0158878 A1 | 8/2004 | Ratnakar et al. | |
| 2004/0184534 A1 | 9/2004 | Wang | |
| 2005/0038826 A1 | 2/2005 | Bae et al. | |
| 2005/0108320 A1 * | 5/2005 | Lord | G06F 17/30038 709/201 |
| 2005/0114896 A1 | 5/2005 | Hug | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0037057 A1 | 2/2006 | Xu | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0044010 A1 * | 2/2007 | Sull | G06F 17/30796 715/202 |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0101271 A1 | 5/2007 | Hua et al. | |
| 2007/0101387 A1 | 5/2007 | Hua et al. | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckx-Deleersnijder et al. | |
| 2007/0156770 A1 * | 7/2007 | Espelien | G06F 17/30017 |
| 2007/0168541 A1 | 7/2007 | Gupta et al. | |
| 2007/0168542 A1 | 7/2007 | Gupta et al. | |
| 2007/0180125 A1 | 8/2007 | Knowles et al. | |
| 2007/0217759 A1 | 9/2007 | Dodd | |
| 2007/0234391 A1 | 10/2007 | Hunter et al. | |
| 2007/0239839 A1 | 10/2007 | Buday et al. | |
| 2007/0292107 A1 | 12/2007 | Yahata et al. | |
| 2008/0005175 A1 | 1/2008 | Bourke et al. | |
| 2008/0046925 A1 | 2/2008 | Lee et al. | |
| 2008/0066099 A1 | 3/2008 | Brodersen et al. | |
| 2008/0086456 A1 | 4/2008 | Rasanen et al. | |
| 2008/0086747 A1 | 4/2008 | Rasanen et al. | |
| 2008/0120389 A1 | 5/2008 | Bassali et al. | |
| 2008/0126248 A1 | 5/2008 | Lee et al. | |
| 2008/0134043 A1 * | 6/2008 | Georgis | G06F 17/30035 715/733 |
| 2008/0137736 A1 | 6/2008 | Richardson et al. | |
| 2008/0184119 A1 | 7/2008 | Eyal et al. | |
| 2008/0187283 A1 | 8/2008 | Takahashi | |
| 2008/0192818 A1 | 8/2008 | DiPietro et al. | |
| 2008/0195664 A1 | 8/2008 | Maharajh et al. | |
| 2008/0195744 A1 | 8/2008 | Bowra et al. | |
| 2008/0256105 A1 | 10/2008 | Nogawa et al. | |
| 2008/0263354 A1 | 10/2008 | Beuque | |
| 2008/0279535 A1 | 11/2008 | Haque et al. | |
| 2008/0310454 A1 | 12/2008 | Bellwood et al. | |
| 2008/0310496 A1 | 12/2008 | Fang | |
| 2008/0313541 A1 | 12/2008 | Shafton et al. | |
| 2009/0031220 A1 | 1/2009 | Tranchant et al. | |
| 2009/0048852 A1 | 2/2009 | Burns et al. | |
| 2009/0055546 A1 | 2/2009 | Jung et al. | |
| 2009/0060452 A1 | 3/2009 | Chaudhri | |
| 2009/0066839 A1 | 3/2009 | Jung et al. | |

(56) References Cited

U.S. PATENT DOCUMENTS

| | | |
|---|---|---|
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0150406 A1 | 6/2009 | Giblin |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0226148 A1 | 9/2009 | Nesvadba et al. |
| 2009/0293116 A1 | 11/2009 | DeMello et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0095121 A1 | 4/2010 | Shetty et al. |
| 2010/0111192 A1 | 5/2010 | Graves |
| 2010/0142917 A1 | 6/2010 | Isaji |
| 2010/0158109 A1 | 6/2010 | Dahlby et al. |
| 2010/0186092 A1 | 7/2010 | Takechi et al. |
| 2010/0189183 A1 | 7/2010 | Gu et al. |
| 2010/0228795 A1 | 9/2010 | Hahn et al. |
| 2010/0235472 A1 | 9/2010 | Sood et al. |
| 2010/0250532 A1 | 9/2010 | Soroushian et al. |
| 2011/0047209 A1 | 2/2011 | Lindholm et al. |
| 2011/0066673 A1 | 3/2011 | Outlaw |
| 2011/0080940 A1 | 4/2011 | Bocharov |
| 2011/0082924 A1 | 4/2011 | Gopalakrishnan |
| 2011/0126191 A1 | 5/2011 | Hughes et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0268178 A1 | 11/2011 | Park |
| 2011/0276555 A1* | 11/2011 | Fiero .................. G06F 17/30864 707/706 |
| 2011/0302319 A1 | 12/2011 | Ha et al. |
| 2011/0305273 A1 | 12/2011 | He |
| 2011/0314176 A1 | 12/2011 | Frojdh et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0179834 A1 | 7/2012 | van der Schaar |
| 2012/0254455 A1 | 10/2012 | Adimatyam et al. |
| 2012/0278496 A1 | 11/2012 | Hsu |
| 2012/0307883 A1 | 12/2012 | Graves |
| 2012/0311094 A1 | 12/2012 | Biderman et al. |
| 2013/0044821 A1 | 2/2013 | Braness et al. |
| 2013/0046902 A1 | 2/2013 | Villegas et al. |
| 2013/0061045 A1 | 3/2013 | Kiefer et al. |
| 2013/0114944 A1 | 5/2013 | Soroushian et al. |
| 2013/0166765 A1 | 6/2013 | Kaufman |
| 2013/0166906 A1 | 6/2013 | Swaminathan et al. |
| 2014/0101722 A1 | 4/2014 | Moore |
| 2014/0189065 A1 | 7/2014 | van der Schaar et al. |

FOREIGN PATENT DOCUMENTS

| | | |
|---|---|---|
| EP | 1553779 A1 | 7/2005 |
| JP | 8111842 A | 4/1996 |
| JP | 09037225 A | 2/1997 |
| JP | 2002518898 A | 6/2002 |
| JP | 2004515941 A | 5/2004 |
| JP | 2004234128 A | 8/2004 |
| JP | 2007235690 A | 9/2007 |
| KR | 669616 | 9/2007 |
| WO | 9613121 | 5/1996 |
| WO | 9965239 A2 | 12/1999 |
| WO | 0208948 A2 | 1/2002 |
| WO | 0235832 A2 | 5/2002 |
| WO | 2004102571 A1 | 11/2004 |
| WO | 2007044590 A2 | 4/2007 |
| WO | 2007073347 A1 | 6/2007 |
| WO | 2008042242 A2 | 4/2008 |
| WO | 2008090859 A1 | 7/2008 |
| WO | 2009065137 A1 | 5/2009 |
| WO | 2010060106 A1 | 5/2010 |
| WO | 2010080911 A1 | 7/2010 |
| WO | 2010122447 A1 | 10/2010 |
| WO | 2012/094181 A2 | 7/2012 |
| WO | 2012/094189 A1 | 7/2012 |
| WO | 2012094171 A1 | 7/2012 |

OTHER PUBLICATIONS

"What is Fliggo?", Wayback Machine, printed Aug. 15, 2016 from https://web.archive.org/web/20080623065120/http://www.fliggo.com/about, 3 pgs.

Anonymous, "Method for the encoding of a compressed video sequence derived from the same video sequence compressed at a different bit rate without loss of data", ip.com, ip.com number: IPCOM000008165D, May 22, 2002, pp. 1-9.

Author Unknown, "Blu-ray Disc—Blu-ray Disc—Wikipedia, the free encyclopedia", printed Oct. 30, 2008 from http://en.wikipedia.org/wiki/Bluray_Disc, 11 pgs.

Author Unknown, "Blu-ray Movie Bitrates Here—Blu-ray Forum", printed Oct. 30, 2008 from http://forum.blu-ray.com/showthread.php?t=3338, 6 pgs.

Author Unknown, "O'Reilly—802.11 Wireless Networks: The Definitive Guide, Second Edition", printed Oct. 30, 2008 from http://oreilly.com/catalog/9780596100520, 2 pgs.

Author Unknown, "Tunneling QuickTime RTSP and RTP over HTTP", Published by Apple Computer, Inc.: 1999 (month unknown)6 pages.

Author Unknown, "Turbo-Charge Your Internet and PC Performance", printed Oct. 30, 2008 from Speedtest.net—The Global Broadband Speed Test, 1 pg.

Author Unknown, "When is 54 Not Equal to 54? A Look at 802.11a, b and g Throughput", printed Oct. 30, 2008 from www.oreillynet.com/pub/a/wireless/2003/08/08/wireless_throughput.html, 4 pgs.

Author Unknown, "White paper, The New Mainstream Wireless LAN Standard", Broadcom Corporation, Jul. 2003, 12 pgs.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.

Garg et al., "An Experimental Study of Throughput for UDP and VoIP Traffic in IEEE 802.11b Networks", Wireless Communications and Networkings, Mar. 2003, pp. 1748-1753.

Kozintsev et al., "Improving last-hop multicast streaming video over 802.11", Workshop on Broadband Wireless Multimedia, Oct. 2004, pp. 1-10.

Lew et al., "Content-Based Multimedia Information Retrieval: State of the Art and Challenges", ACM Transactions on Multimedia Computing, Communications and Applications, Feb. 2006, vol. 2, No. 1, pp. 1-19.

Lomas et al., "Educause Learning Initiative, Collaboration Tools", Educause Learning Initiative, Aug. 2008, Eli Paper 2: 2008, 11 pgs.

Montes, "Muusic: mashup de servicios web musicales", Ingenieria Tecnica en Informatica de Gestion, Nov. 2008, 87 pgs.

(56) References Cited

OTHER PUBLICATIONS

Noe, A., "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, 1-51.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Tan. Yap-Peng et al., "Video transcoding for fast forward/reverse video playback", IEEE ICIP, 2002, pp. I-713 to I-716.
Wang et al., "Image Quality Assessment: From Error Visibility to Structural Similarity", IEEE Transactions on Image Processing, Apr. 2004, vol. 13, No. 4, pp. 600-612.
Weng, "A Multimedia Socail-Networking Community for Mobile Devices", 2007, 30 pgs.
Wu, Feng et al., "Next Generation Mobile Multimedia Communications: Media Codec and Media Transport Perspectives", In China Communications, Oct. 2006, pp. 30-44.
European Search Report Application No. EP 08870152, Completed May 19, 2011, Mailed May 26, 2011, 10 pgs.
European Search Report for Application 11855103.5, completed Jun. 26, 2014, 9 pgs.
European Search Report for Application 11855237.1, completed Jun. 12, 2014, 9 pgs.
Supplementary European Search Report for Application No. EP 10729513, International Filing Date Jan. 7, 2010, Completed Dec. 9, 2013, 4 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, Printed on Mar. 26, 2014, 3 pgs.
International Search Report and Written Opinion for International Application No. PCT/US08/87999, completed Feb 7, 2009, mailed Mar. 19, 2009, 6 pgs.
International Search Report and Written Opinion for International Application PCT/US2011/066927, Completed Apr. 3, 2012, Mailed Apr. 20, 2012, 14 pgs.
International Search Report and Written Opinion for International Application PCT/US2011/067167, Completed Jun. 19, 2012, Mailed Jul. 2, 2012, 11 pgs.
International Search Report and Written Opinion for International Application PCT/US2010/020372, Search Report mailed Mar. 1, 2010, 7 pgs.
ITS International, "Fleet System Opts for Mobile Server", Aug. 26, 1999, Printed on Oct. 21, 2011 from http://www.itsinternational.com/News/article.cfm?recordID=547, 1 page.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Wayback Machine, Grooveshark—Features, All Your Music in One Place, printed Aug. 15, 2016 from https://web.archive.org/web/20081013115837/http://www,grooveshark.com/features, 6 pgs.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4pgs.

* cited by examiner

SINGULAR, COLLECTIVE AND AUTOMATED CREATION OF A MEDIA GUIDE FOR ONLINE CONTENT

CROSS REFERENCE TO RELATED APPLICATIONS

The current application is a continuation of U.S. patent application Ser. No. 13/938,100 filed Jul. 9, 2013, entitled "Singular, Collective and Automated Creation of a Media Guide for Online Content", which is a continuation of U.S. patent application Ser. No. 13/684,002 filed Jan. 7, 2010, entitled "Singular, Collective and Automated Creation of a Media Guide for Online Content", which claims the benefit of U.S. Provisional Patent Application No. 61/143,114, filed Jan. 7, 2009. The entire disclosures of U.S. patent application Ser. Nos. 13/938,100, 12/684,002 and 61/143,114 are hereby incorporated by reference as if set forth in full herein.

BACKGROUND

The present invention generally relates to digital content distribution systems and in particular to media content systems that generates, distributes and uses media content guides.

The availability of Internet content has dramatically reshaped the landscape for how a user acquires, interacts with, and ultimately consumes content. Numerous websites today host audio and video programs, ranging from user-generated videos, news-reports and podcasts, to prime-time and syndicated full-length television shows and movies in high definition. The number of these offerings through different Internet portals is ever expanding, with each website pursuing a different business model in an effort to monetize their content offering.

Therefore, there has become a need to identify, maintain and distribute content that maximizes the consumption and display of such content as well as provide efficient distribution of such content.

SUMMARY

Generally, guide creation, access and distribution content systems and methods are provided. In one embodiment, a content guide system is provided. The system comprises a content server, a tag server, a tagging device and a playback device. The content server is configured to provide access to content. The tag server includes a searchable database of tags. The tagging device is in network communication with the tag server and the content server, where the tagging device is configured to access content via the content server and to automatically generate at least one tag referencing the accessed content that is provided to the tag server for inclusion into the searchable database of tags. The playback device is in network communication with the tag server and the content server, where the playback device is configured to search the database; retrieve, from the database, a tag that references content accessible via the content server and access the content referenced by the retrieved tag via the content server.

In various embodiments, each tag includes an identifier of the content and location information of the content where the identifier is a unique database identifier and the location information is associated to a uniform resource identifier. In other embodiments, the identifier and the location information is substantially smaller in size than the content. In one embodiment, the tags do not include a temporal component that describes or references a particular time or date in which the content is available for consumption. In other embodiments, the tags are a subset of data within a database having data unrelated to the tags and the content in which the tags refer. In another embodiment, the tags include at least one identifier associating the tags to a specific content guide within the database and in a further embodiment the database is larger in size than the database of tags.

In another embodiment, a method of accessing content distributed throughout a network is provided. The method comprises generating a tag referencing a piece of content accessible via a content server using a tagging device; adding the generated tags to a searchable database of tags by a tag server; and accessing the database, selecting at least one tag and retrieving content from the content server referenced by the retrieved tag by a playback device.

Many of the attendant features of the present invention will be more readily appreciated as the same becomes better understood by reference to the foregoing and following description and considered in connection with the accompanying drawings.

DETAILED DESCRIPTION

With an expanding selection of content from differing Internet portals, a content guide in accordance with an embodiment of the invention provides a tool for navigating the plethora of the available content. The content guide in one embodiment is a queue or database of tags associated with a single user, a group of users or a channel subscribed to by users that enables the retrieval of content for sequential and/or subsequent viewing and in other embodiments is a navigable listing of tags referencing content that can enables access to content via searching, and/or categorized directories and which is supplemented by recommendations and data from third party sources. A guide in accordance with an embodiment of the invention can be created by a user while he or she navigates different portals using a browser that includes plug-in software, javascript or another similar interface enabling the user to mark different audio or video content for later viewing. These tags can be saved locally or on a network account and subsequently accessed through a web browser or by another application on a personal computer or a consumer electronics device capable of accessing those tags and presenting the selected content on a platform such as a digital television. In many embodiments, the decoding of the content is performed by the device using the guide to access content. The guide simplifies the retrieval of content across a large number of sites and enables viewing of content on multiple devices.

In accordance with various embodiments of the invention, the media content guide enables sharing of tagged content within an online community, and the formation of collections of tags based on the community's recommendations. The community's tags can also be coupled with an individual's preferences to create recommendations for online content consumption. In addition, a user's personal preferences may be used by a remote or recommendation server which scans existing and newly added content, such that recommendations can be created for the user on a periodic basis.

Systems and methods in accordance with embodiments of the invention create a set of tags or markers related to content on the Internet or network along with any related information. The tags form a media guide that is ready for subsequent recollection and use by an individual to access and play the encompassed content. This media guide can be created in many ways, such as individual interaction, cooperation of a community of users, or through an automated system tailored to each individual's or community's preferences. The information gathered on the individual or collective content-consumption habits can be subsequently used to develop additional content and/or goods and services offerings for specific users or classes of users.

Figure 1:
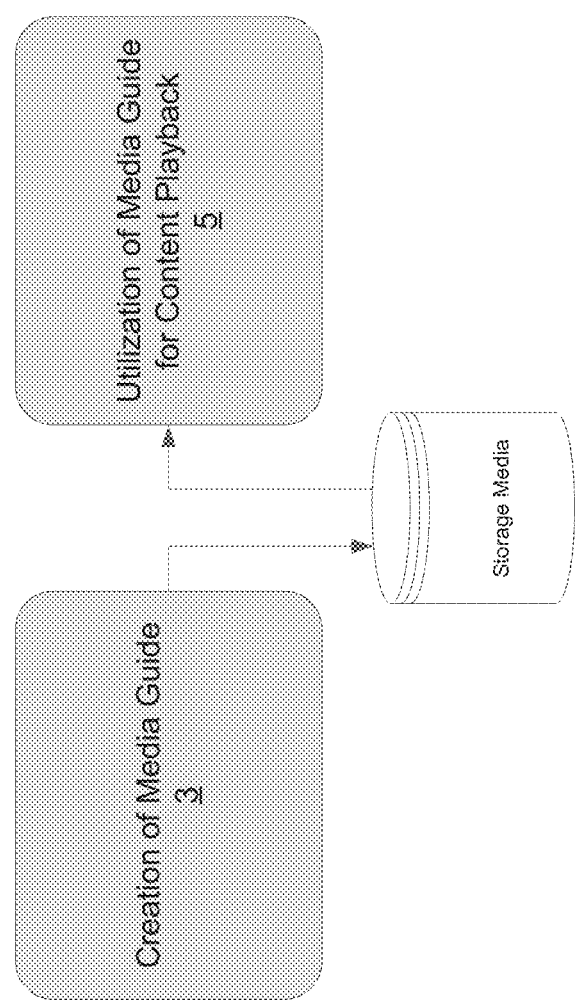
FIG. 1 is a block diagram illustrating an overview guide generation and utilization process in accordance with various embodiments of the present invention.

Program directories, libraries or guides in accordance with embodiments of the invention are constructed in several distinct parts, the collection of which aid in the creation of a guide for accessing online content on a personal computer, mobile phone, or a consumer electronics device. In various embodiments, as shown in FIG. 1, the process occurs at two distinct steps: The creation of the guide, where a distinct set of content have been selected (3), and the utilization of the guide for accessing the selected content playback (5). The term content is used herein to refer to any audio, video, image, or multimedia files or presentations which can be either downloaded or consumed directly via a web-browser or other application for viewing media content, plus any data describing those presentation or files (e.g., metadata).

Figure 2:
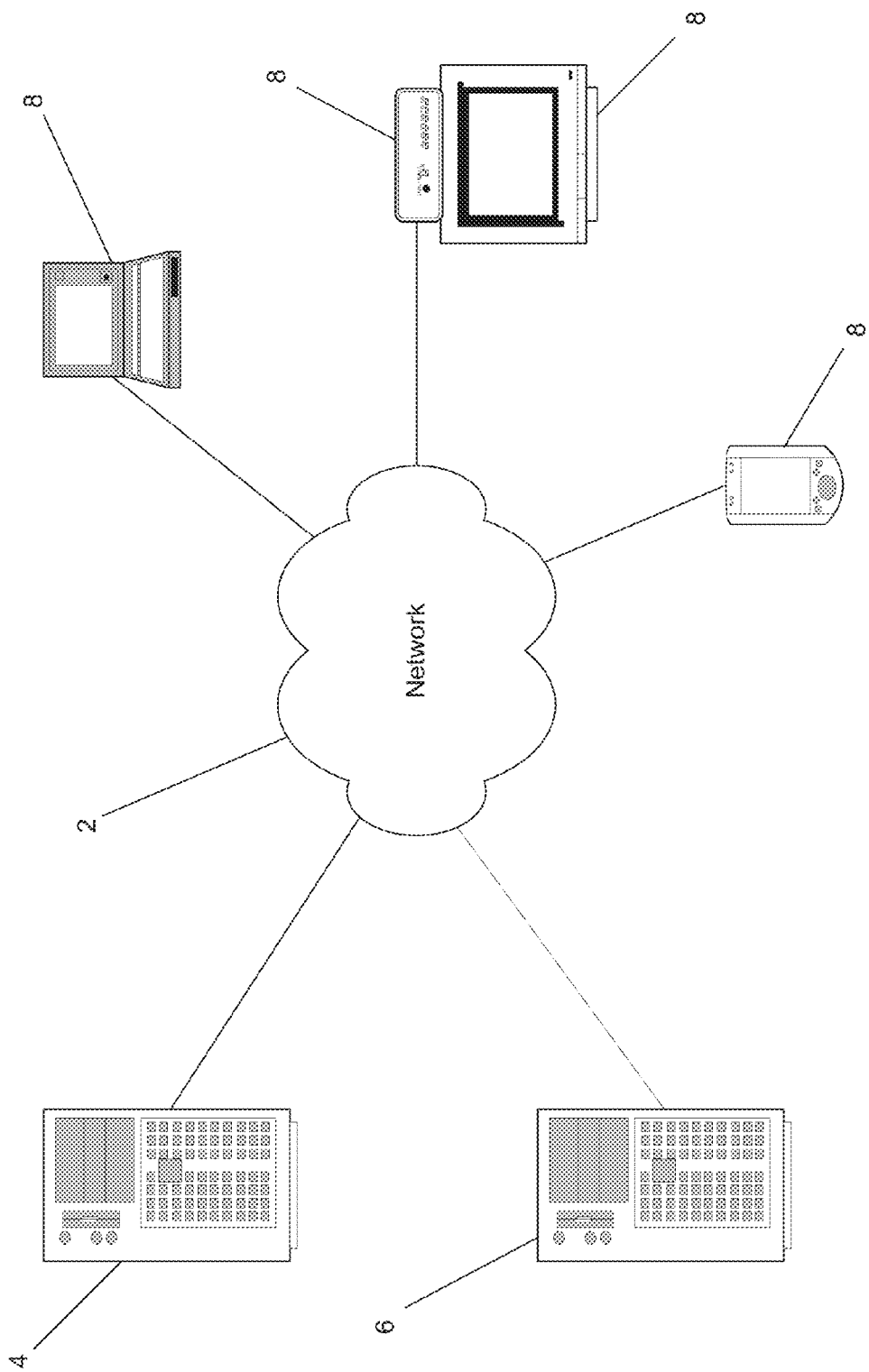
FIG. 2 is a block diagram of a guide creation, access and distribution multimedia system in accordance with various embodiments of the present invention.

Turning now FIG. 2 in which a conceptual system drawing of the content guide system is shown. Content is distributed throughout a network 2. The network 2 can be the Internet, one or more wide area networks, one or more local area networks or any combination thereof. Within and/or coupled to the network are one or more servers 4, e.g., web servers, media servers, and similar devices or services 6, such as messaging services, microblogs, feed systems or other similar systems, that are in control or at least able to access content distributed in the network. In various embodiments, servers or services can be separated or distinguished as content servers that provide access and/or contain content, tag servers that provide one or more searchable databases of tags referencing the content or a combination of both. Playback devices 8, such as mobile phones, televisions, computers, media players, and various other devices capable of playing back and displaying the content, are also included within and/or coupled to the network. Tagging devices are also included with or separately from the playback devices in which the tagging devices are capable of tagging the content. One or more searchable tag databases or guides are created and stored throughout the network to provide quick and universal access to the content by the playback devices and through the server and/or services. It should be appreciated that playback devices as described throughout the description can in various embodiments also refer to tagging devices and servers or services to content and/or tag servers or services.

It should also be appreciated that in creating the media guide, only markers and/or a limited set of information about or referring to the content are utilized, and the actual content in its entirety is not used in making the guide. Information related to the content may include but is not limited to: its title, creation time, genre, creator, static or animated thumbnails, and optionally a subset of the content provided in its original format or transformed into a different format.

Guide Creation

The user may individually traverse any site which offers content and add access markers for that content to a database which is later used for creating the guide. In a number of embodiments, the user accesses the sites using a browser application that includes a plug-in or through a JavaScript, which provides the functionality of identifying media embedded within the webpage, providing a user interface enabling the tagging/untagging of media and extracting information related to the media from the web page. When marking the individual contents on a web portal, the page which presents that content and information related to it for consumption or downloading it may be dynamically augmented to present an interface which then enables the addition of that content to the user's media guide. Once added, the web page may be dynamically augmented to note that the content has been added to the user's media guide. When revisiting the same web page, the user may be allowed to remove content that has already been added to his or her media guide.

Figure 3:
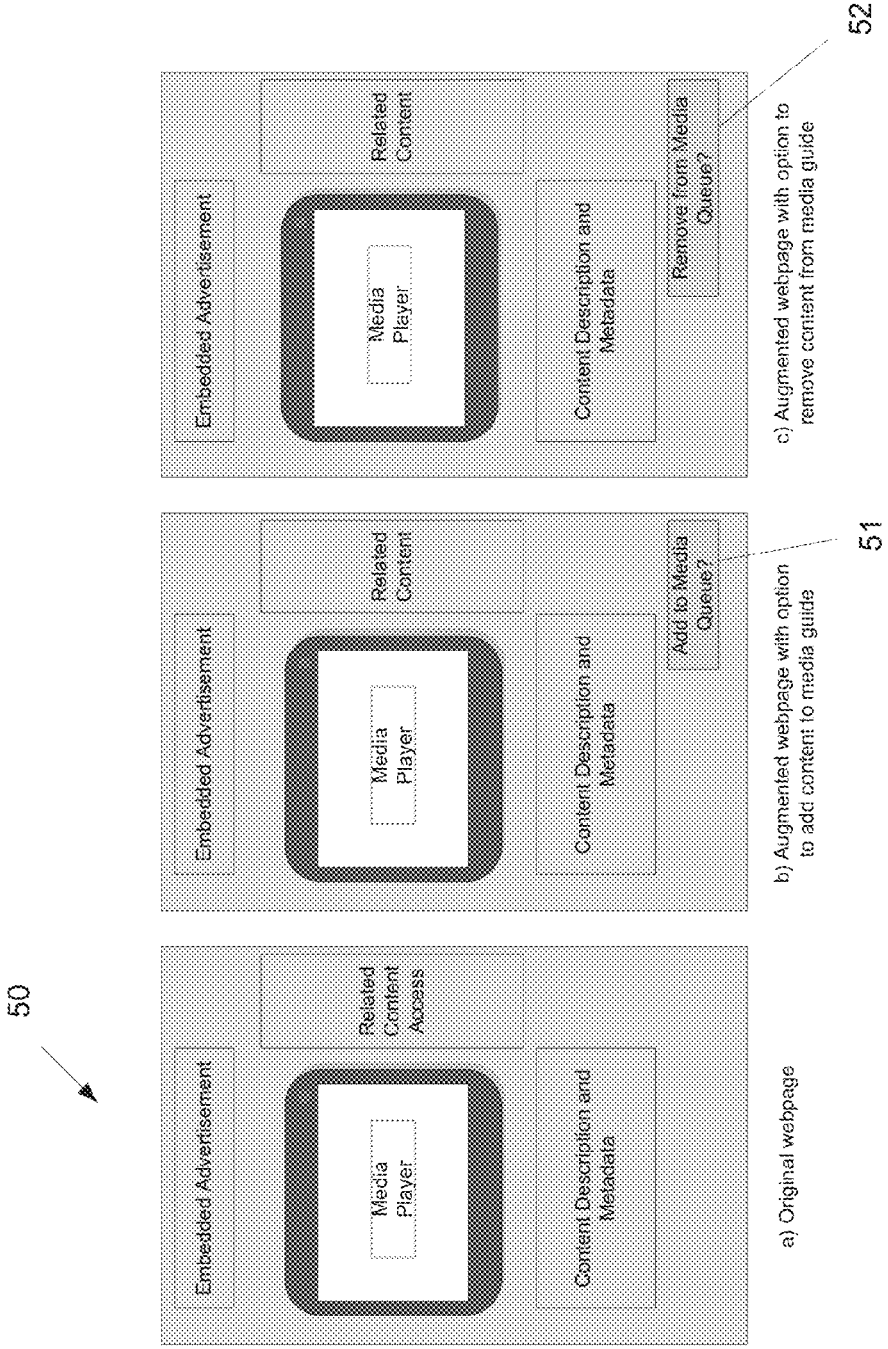
FIG. 3 is a graphical representation of tagging content in accordance with various embodiments of the present invention.
Figure 4:
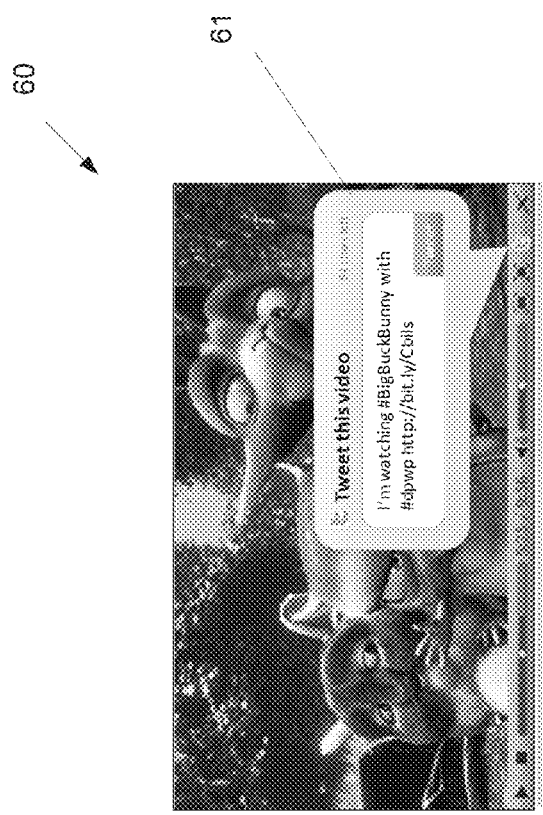
FIG. 4 is a graphical representation of tagging content in accordance with various embodiments of the present invention.

FIG. 3 provides an example of a web-page 50 where media may be presented to a user. Here, we see that the original page may be augmented to present the user with an option to add the content to their media queue 51 via augmentation of the original webpage. Where content has already been added to the database, the user may be presented with an option to remove the content from their media database or queue 52. In several embodiments, the browser plug-in or JavaScript can also communicate the information to a remote device such as a server that maintains a content guide on behalf of the user. FIG. 4 illustrates another example of tagging content 60 via a messaging service. As shown, a browser plug-in or JavaScript in accordance with an embodiment of the invention has automatically pre-filled the tweet or message 61 providing such a message as "I'm watching # [video hash tag] with # divxweb[shortened URL]". The shortened URL is generated using a URL shortening service to provide the location of the content, which is typically a different identifier to that of a web page in which the content is embedded, and the video hash tag (#divxweb) is provided as an embedded code parameter to identify the content, both of which are not be editable by the user. In one embodiment, the hash tag is generated from information related to the content, e.g., utilizing the filename, metadata and other similar content identifiers. Although a specific short message format is shown in FIG. 4, alternate messages appropriate to an application can also be utilized in accordance with embodiments of the invention. In various embodiments, an interface is provided to mark content that may be unplayable using with the playback device or player to be subsequently played on another device capable of playing the content. For example, a mobile phone searching or browsing a website through a javascript can tag content, such as a user can input an e-mail address through which the tagged content can be shared or marked to be added to the media guide. The content can then be accessed later via the guide or e-mail on a computer or similar device that is capable or better suited for playing the tagged content.

In one embodiment, the user may choose to share his or her media guide with other people via any electronic means such as email or as part of a service offered by a social group website, an online community, or an application that aggregates messages based upon identifiers including but not limited to hash tags. Tags can be shared by direct upload to the servers of the social group website via an API or can be shared by uploading to media guide server that then provides tagged content information from users to the servers of the social group website via an API. During the process of sharing, the user may recommend particular selections from the media guide, or alternatively share the entire guide with other members of his/her electronic community. Likewise, the user may receive recommendations or complete guides from his/her online community, with or without sharing any of his/her guide information. As a result, a media guide may be built upon the recommendations of members of an online community and filtered based on a set of predetermined metrics selected by the user or otherwise determined algorithmically by taking in metrics such as the user's demographics, the contents of his/her personal media guide, etc.

A service in one embodiment offers each individual customization capabilities based on his or her preferences or based on the content of their personal or collective media guide. Alternatively, separate guides may be available for access by users based on preset categories which groups like content together based on specific characteristics such as genre, type, production year, subject, etc. A list of web portals may be processed in an automated fashion in part or whole and content markers added to the user's media guide and/or a general guide. Again, this media guide may be populated by a set of predetermined metrics selected by the user or otherwise determined algorithmically by taking in metrics such as the user's demographics, the contents of his/her personal and collective media guides, etc. This service may operate on a remote server, on a user's computing platform, or a combination thereof.

In one embodiment parts of the system are configurable to access new web portals chosen by the user through an augmentation of the cataloging process used by the service. This augmentation may be added through additional instructions presented in the form of a platform-independent interpreted language, or through the addition of object and binary code to the original software of the service. The instructions supporting this augmentation can come from a third party source or the original distributor of the service, or a combination thereof.

The media guide may be created locally on storage media associated with the user's computing platform, or alternatively created on storage media associated with a remote server which can be accessed by the user. When an automated service or server is creating the guide, the service accesses the user's media guide on a predetermined storage media. Regardless of the location of the media guide, the playback device possesses the capability of accessing the media guide such that it can present the user with the media guide and allow the user to view part or all elements of the guide and select the consumption of content through the markers or tags which are available in the guide. In a number of embodiments, the guide is resident on a first device that is accessible over a local network via a second device. In various embodiments, the guide is resident on a server that is accessible over the Internet via a viewing device. In both instances, the device accessing the guide uses the tags within the guide to retrieve the content corresponding to specific tags via the Internet.

Content Access

The creation of the guide and access to the guide are typically separate in time, and may be composed in separate locations and on different device categories. During a time gap, a pre-caching of content can take place. For example, some or all of the tagged content can be progressively downloaded onto local storage which is accessible by the playback device and/or to direct the pre-caching (manually or intelligently) to the appropriate or desired device in an ecosystem where a user has multiple devices capable of accessing the guide. Where applicable (such as the case of popular content), the use of peer-to-peer technologies may be used to reduce the bandwidth load on the originating content server. These provisions may not be necessary for a basic usage of the media guide which is the direct streaming of content based on the content marker tags of the media guide.

The creation of a media guide can provide certain information about a user's viewing preferences and the types of content that they like to playback. The information about the content can be shared with an outside server and monetized in many different fashions. Based on additional information available in the media guide, it may also be possible to identify content that has been cataloged from legitimate sources that have contracts with the copyright owner versus those which are delivered from an illegitimate source. This identification can lead to monetization models such as advertisement, directed advertisement, offers for sale or acquisition of license to consume the content, or any other monetization techniques that can utilize information regarding the legitimacy of the delivery source of the media.

Some or all of the software and system required for the creation of the media guide may be implemented in a fashion that it can be licensed by $3^{rd}$ parties as a standard development kit (SDK) and subsequently customized by the $3^{rd}$ party licensor based on their specific requirements. In such a model, certain information that can be used for monetization such as the user's viewing preferences and the types of content that they like to playback along with additional information available in the media guide may be reported exclusively back to the licensee of the SDK, or shared mutually between the $3^{rd}$ party licensor and the licensee of the SDK.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed:

1. A content system comprising:
    a first server directed to provide access to pieces of content through a network;
    a second server directed to maintain a searchable database of tags that describe content stored on the first server;
    a first device in communication with the first server and the second server through the network, wherein the first device is directed to:
    automatically generate a message describing a piece of content accessible through the first server, wherein the message comprises a tag describing the piece of content and a URL that references a location of the piece of content;
    provide the generated tag describing the piece of content with the URL that addresses the location of the piece of content to the second server;

a second device in communication with the first server and the second server through the network wherein the second device is directed to:

provide a search query to the second server;

receive search results including the tag that describes the piece of content and the URL referencing the location of the piece of content from the searchable database of tags maintained by the second server; and retrieve and play back the piece of content from the first server using the URL referencing the location of the piece of content.

2. The content system of claim 1, wherein the second server further maintains content guides for different communities of users based on messages automatically generated by devices.

3. The content system of claim 1, wherein the first server is a content server, the second server is a tag server, the first device is a tagging device, and the second device is a playback device.

4. The content system of claim 1, wherein the tag is a text element with a starting character.

5. The content system of claim 4, wherein the tag is a hash tag and the starting character is a # character.

6. The content system of claim 1, wherein the second server stores the tag with the URL in the searchable database of tags.

7. The content system of claim 1, wherein the search query is a search for a tag in the searchable database of tags maintained by the second server.

8. The content system of claim 1, wherein the second server is further directed to maintain the searchable database of tags as part of a service offered by a social group website.

9. The content system of claim 1, wherein the second server is further directed to maintain the searchable database of tags as part of an application that aggregates messages that comprise tags that describe pieces of content and URLs that reference the locations of pieces of content.

10. The content system of claim 1, wherein the first device is further directed to generate the tag describing the piece of content based on information related to the piece of content.

11. The content system of claim 10, wherein the information related to the piece of content comprises at least one of a filename, a piece of metadata, and a content identifier.

12. The content system of claim 1, wherein each tag includes an identifier of a piece of content.

13. The content system of claim 1, wherein the first server is configured to obtain pre-cached portions of the pieces of content.

14. The content system of claim 1, wherein the second device is further directed to automatically generate a second message describing the piece of content that includes the tag and the URL based upon the message automatically generated by the first device.

15. The content system of claim 1, wherein URL that references a location of the piece of content is a shortened URL.

16. The content system of claim 1, wherein the tag describing the piece of content is automatically generated from information related to media from a web page.

17. The content system of claim 1, wherein the automatically generated message identifies a user of the first device.

18. The content system of claim 1, wherein the automatically generated message identifies a service on which the piece of content can be accessed.

19. The content system of claim 1, wherein the first device and the second device are respectively a tagging device and a playback device within a plurality of tagging devices and playback devices.

20. The content system of claim 1, wherein the first device is further directed to upload the message to the second server.

21. The content system of claim 1, wherein the provided message comprises a content recommendation from a user of the first device.

22. The content guide system of claim 21 further comprising a remote server directed to:

scan personal preferences associated with the first device;

scan existing and newly added pieces of content on the first server; and automatically generate recommendation for a user of the first device on a periodic basis.

23. The content system of claim 1, wherein:

the first server is further directed to provide access to pieces of content comprising at least one of an audio file, a video file, an image, and a multimedia file, and the first server is further directed to provide access to the pieces of content along with metadata via at least one of download, and direct consumption via a webbrowser.

24. The content system of claim 1, wherein:

the second server is further directed to maintaining a content guide for the second device, the content guide comprising tags describing pieces of content; and the second device is further directed to retrieve the content guide during search of the searchable database of tags.

25. The content system of claim 24, wherein the second server is further directed to add the tag provided by the first device to the content guide maintained for the second device.

26. The content system of claim 1, wherein the first server is further directed to pre-cache pieces of content to a particular device.

27. The content system of claim 1, wherein the second server is further directed to direct a server to pre-cache pieces of content based on tags received from devices.

28. A method of accessing pieces of content distributed throughout a network, the method comprising:

accessing a piece of content using a first device, wherein the piece of content is accessed from a first server;

automatically generating a message describing the piece of content accessible through the first server, wherein the message comprises a tag describing the piece of content and a URL that references a location of the piece of content;

providing the generated tag describing the piece of content with the URL that addresses the location of the piece of content to a second server using the first device, wherein the second server maintains a searchable database of tags that describe content stored on the first server providing a search query to the second server using a second device in communication with the first server and the second server through the network;

receiving, using the second device, search results including the tag that describes the piece of content and the URL referencing the location of the piece of content from the searchable database of tags maintained by the second server; and retrieving and playing back the piece of content from the first server using the URL referencing the location of the piece of content and using the second device.

29. The method of claim 28, wherein the tag is a hash tag and has a starting character that is a # character.

30. The method of claim 28, wherein the search query is a search for a tag in the searchable database of tags maintained by the second server.

31. A content system comprising:
- a content server directed to provide access to pieces of content through a network,
- a hash tag server directed to maintain a searchable database of hash tags that reference pieces of content stored on the content server;
- a tagging device in communication with the content server and the hash tag server through the network, wherein the tagging device is directed to:
- automatically generate a message describing a piece of content accessible through the content server, wherein the message comprises a hash tag describing the piece of content and a URL that references a location of the piece of content;
- provide the hash tag describing the piece of content with the URL that addresses the location of the piece of content to the hash tag server;
- a playback device in communication with the content server and the hash tag server through the network, wherein the playback device is directed to:
- provide a search query to the hash tag server;
- receive search results including the hash tag that describes the piece of content and the URL referencing the location of the piece of content from the searchable database of hash tags maintained by the hash tag server; and
- retrieve and play back the piece of content from the content server using the URL referencing the location of the piece of content.

* * * * *